3,325,021
STACK HANDLING APPARATUS
Hugh C. Burns, Porterville, and Willard W. Smith, Gordon J. Coolidge, and Chester E. Dean, Lindsay, Calif., assignors to FMC Corporation, San Jose, Calif., a corporation of Delaware
Continuation of application Ser. No. 238,458, Nov. 19, 1962. This application Oct. 12, 1965, Ser. No. 500,479
4 Claims. (Cl. 214—6)

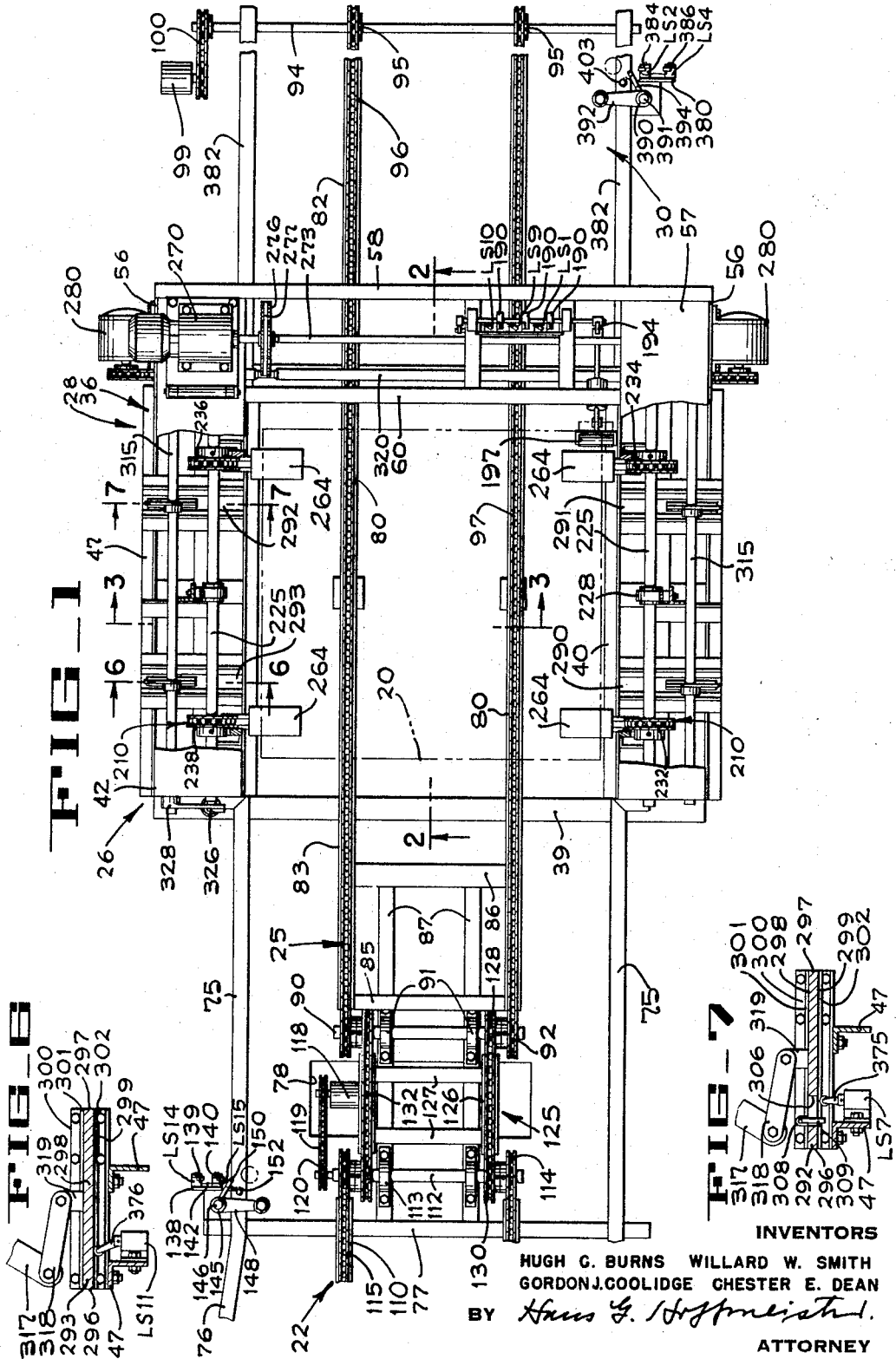

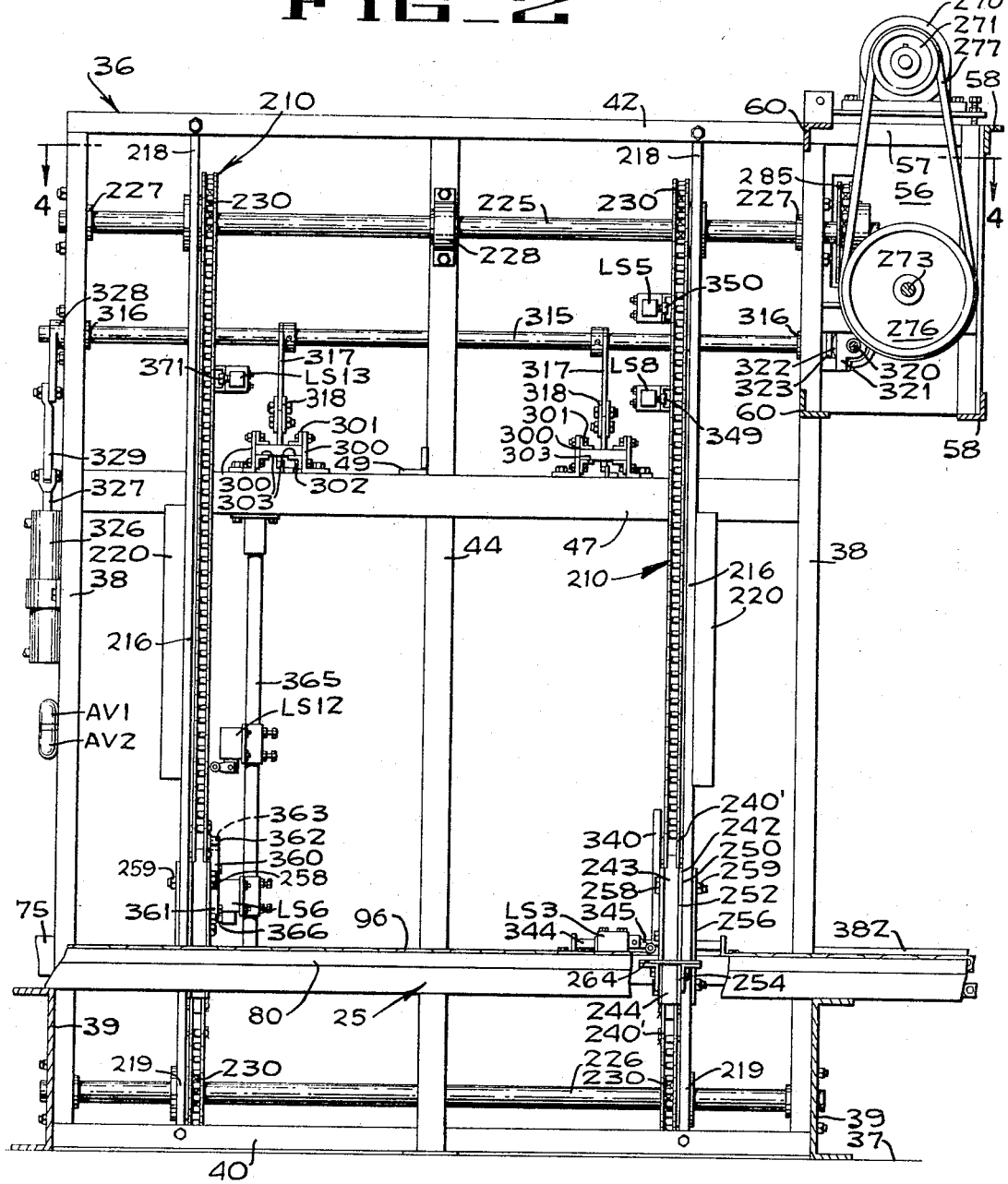

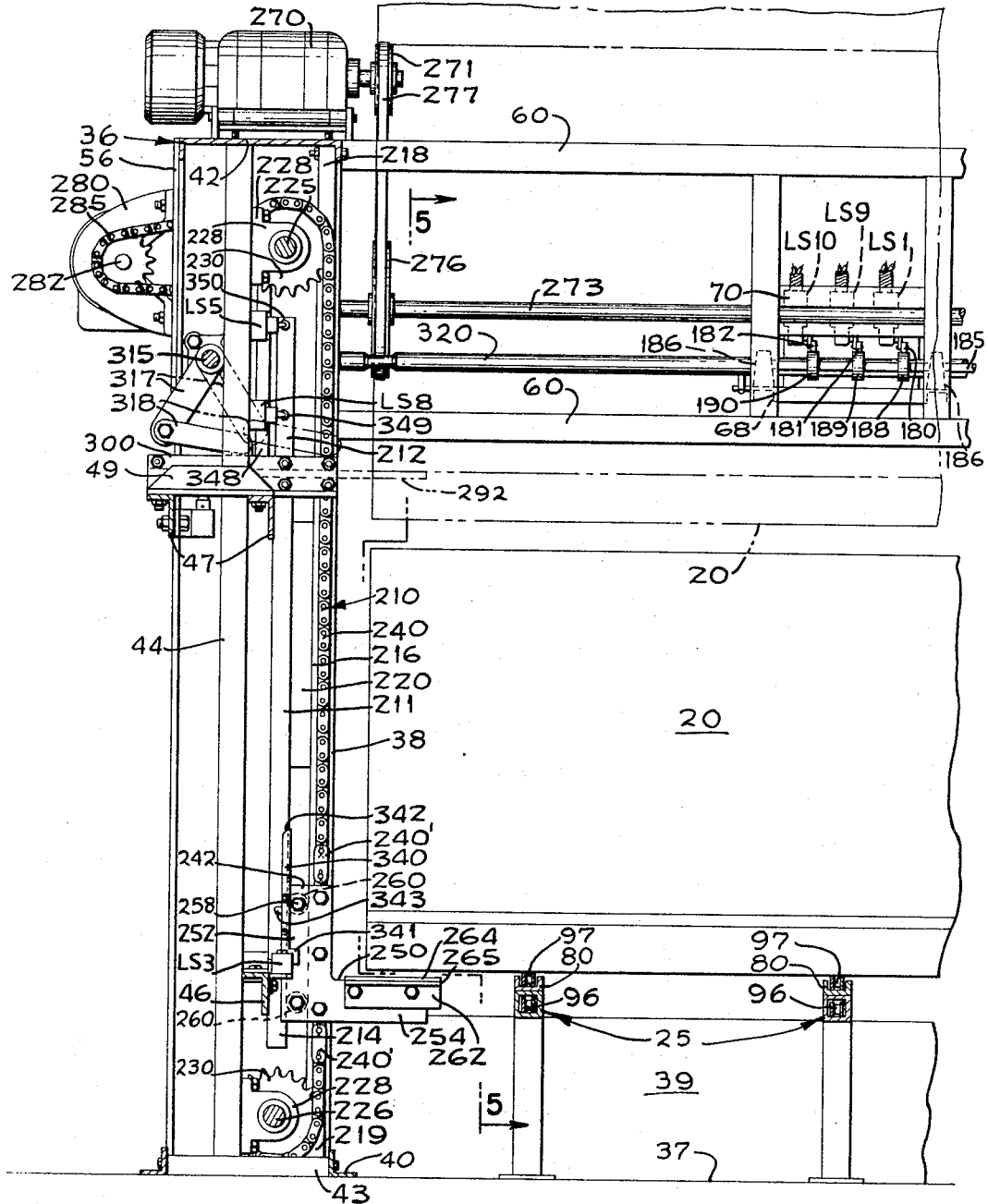
FIG_3

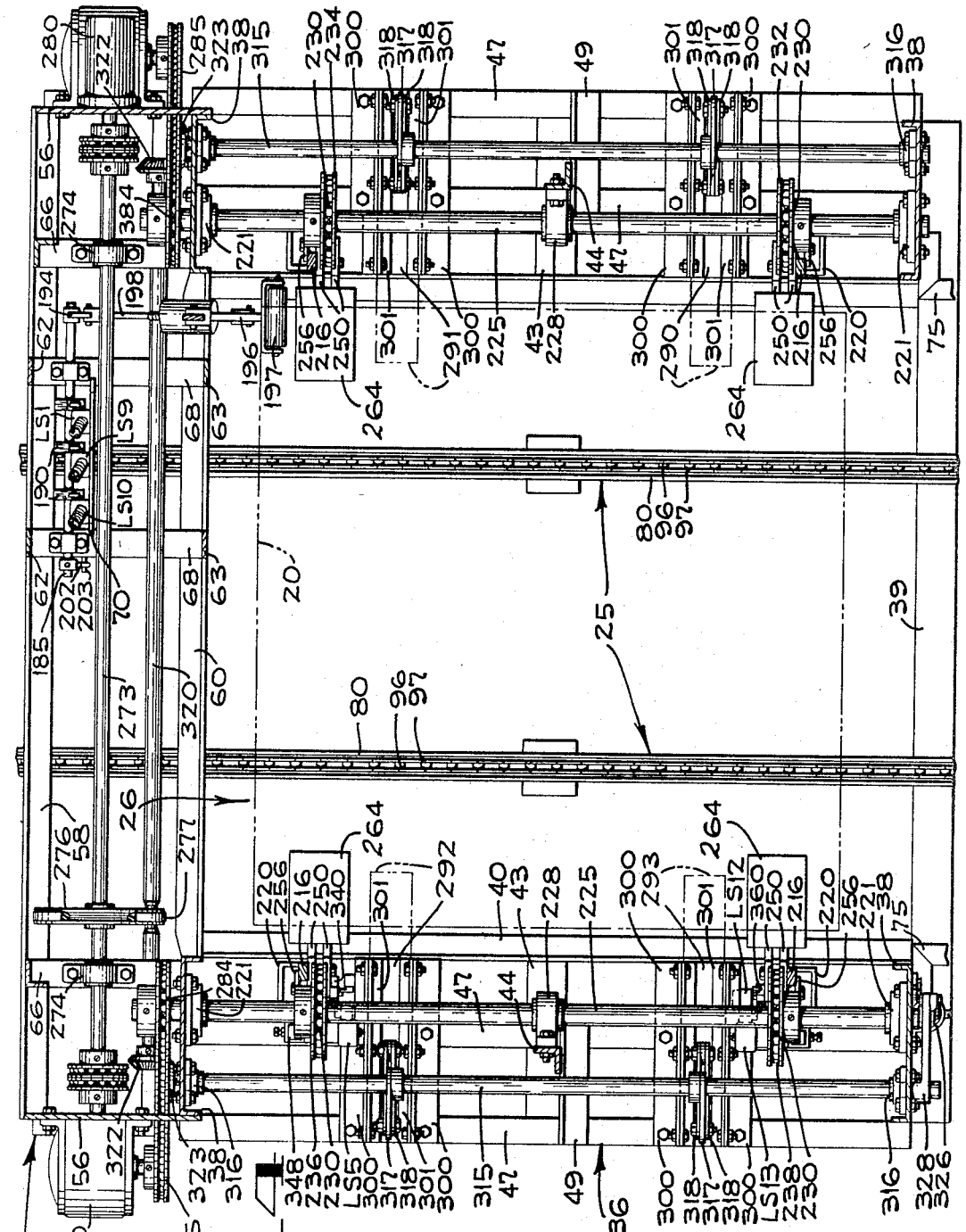

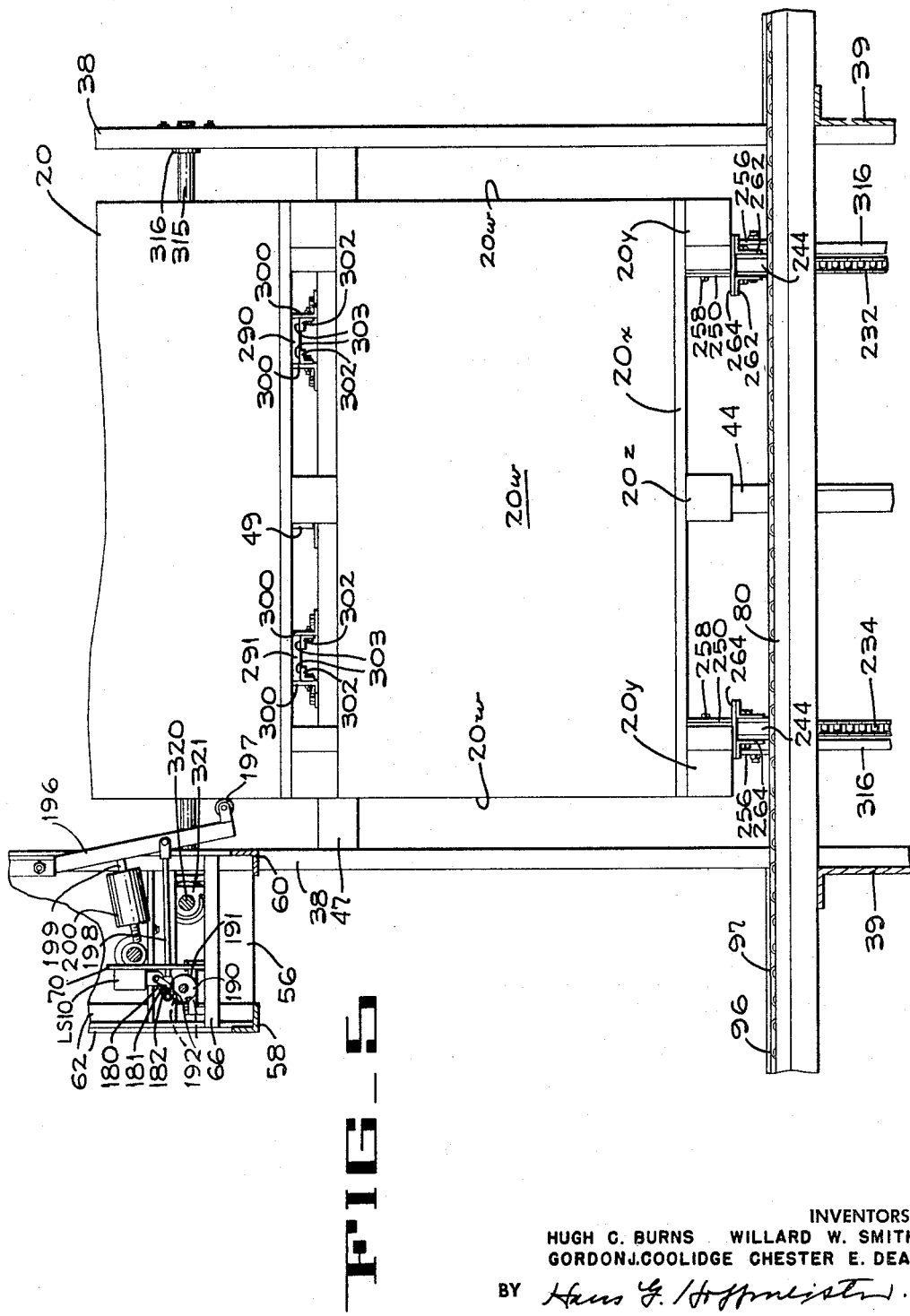

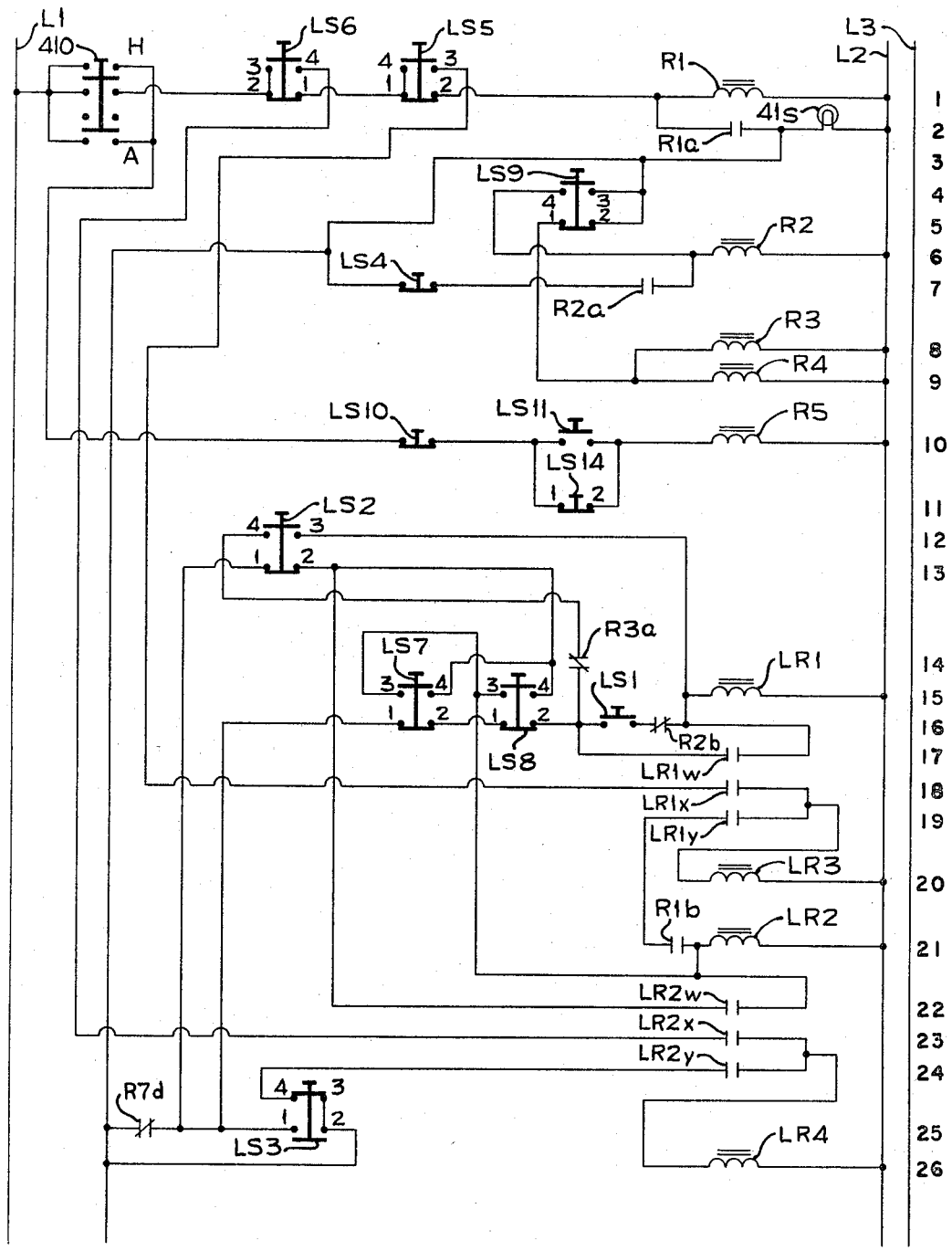
FIG_8A

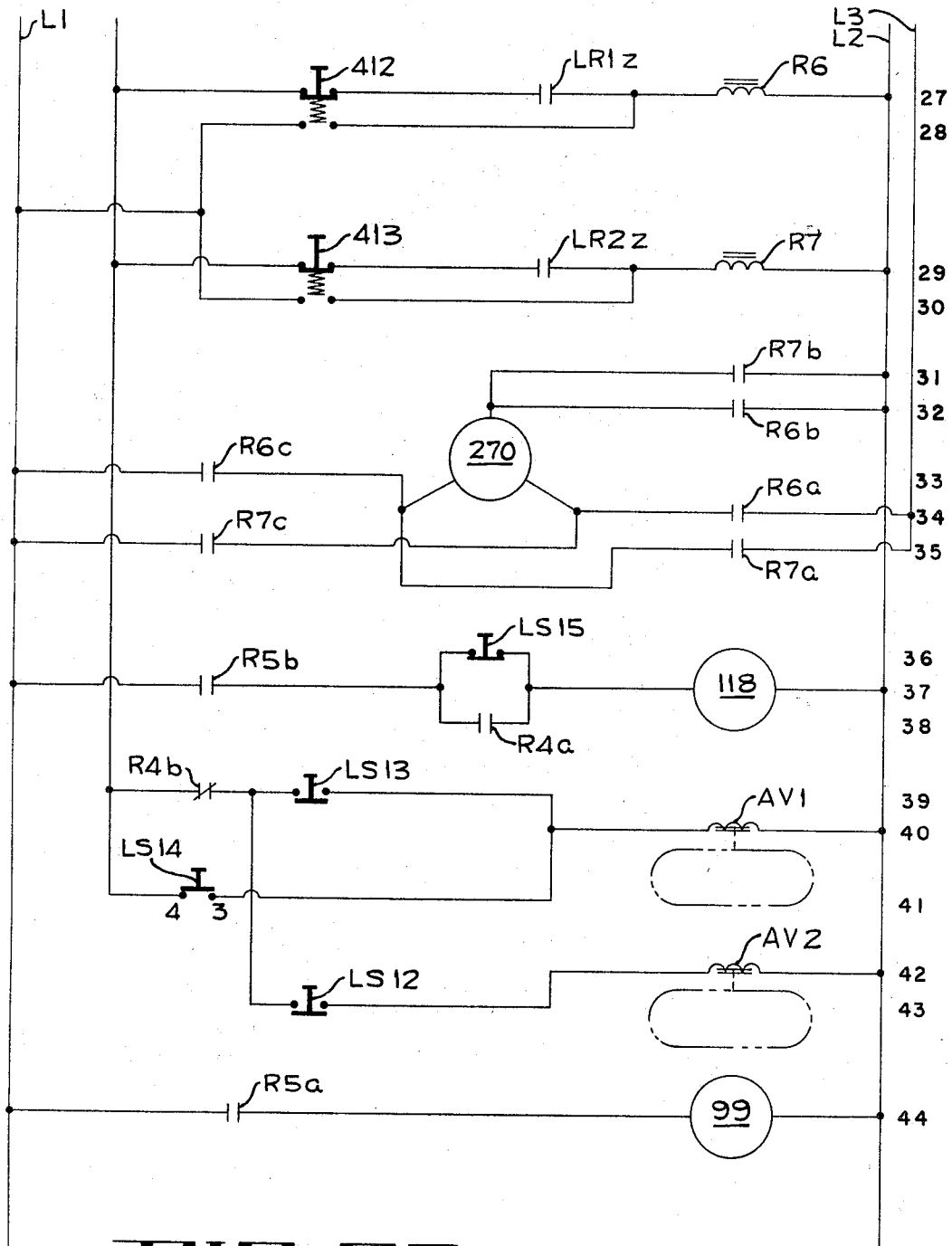
FIG_8B

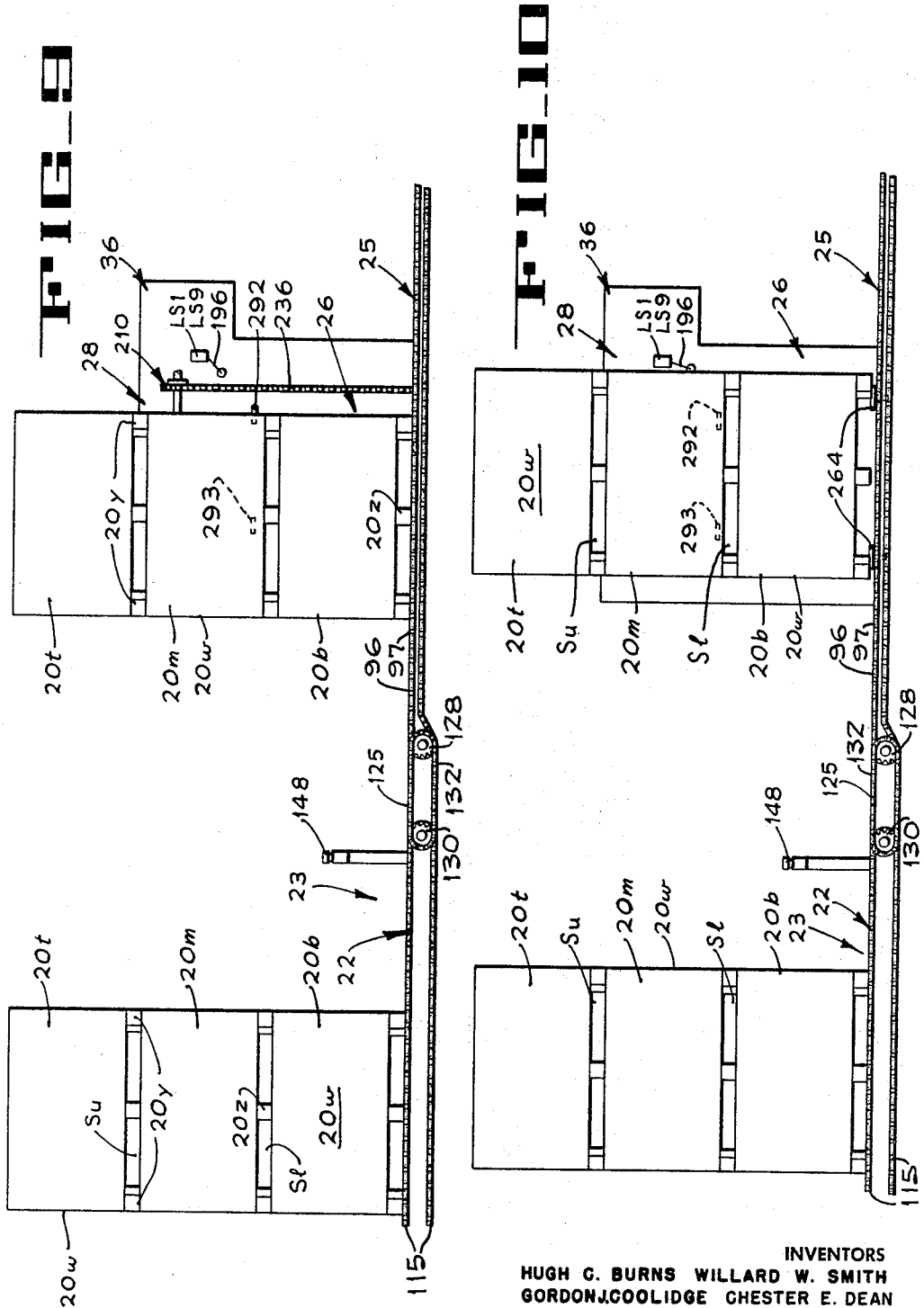

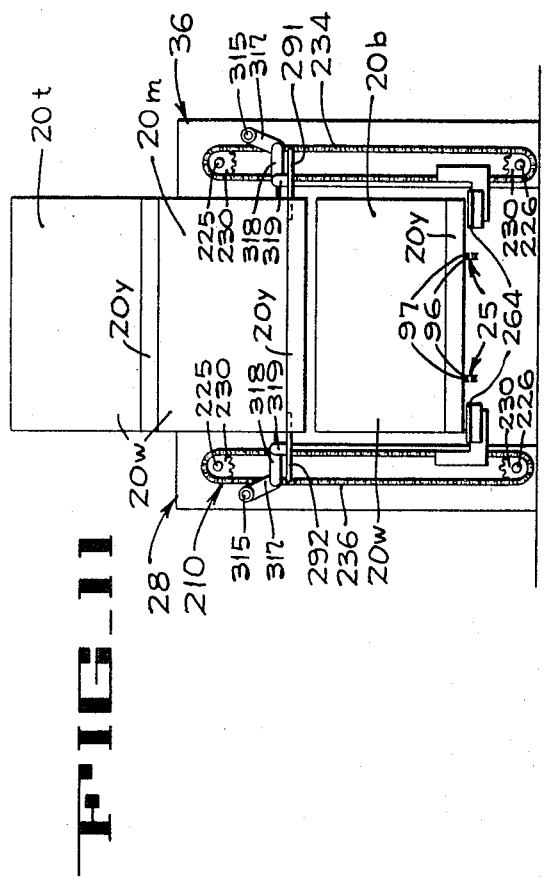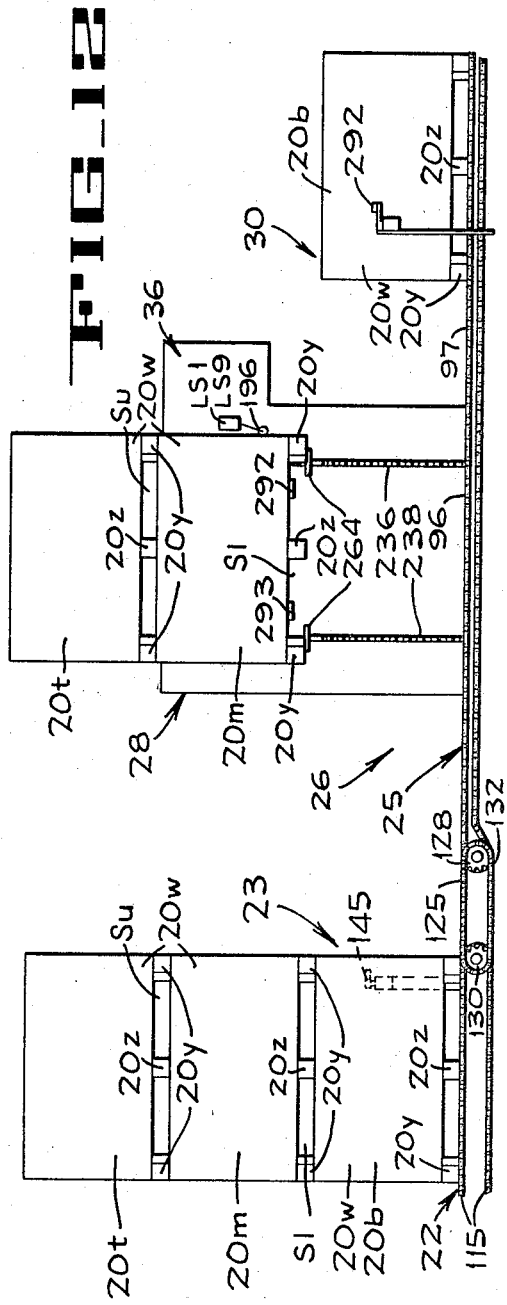

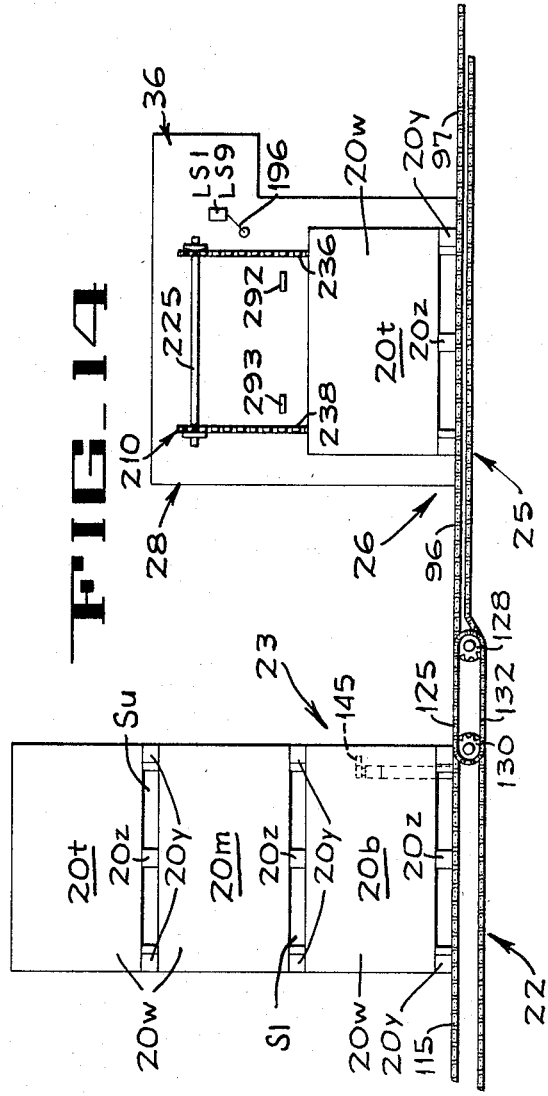

This application is a continuation of our copending application Ser. No. 238,458, filed Nov. 19, 1962, now abandoned.

The present invention pertains to a stack handling apparatus and more particularly to an apparatus for unstacking a stack of loads such as bulk bins, or for stacking such loads, wherein adjacent loads in the stack are maintained in vertically spaced relation to each other.

Although machines for stacking and unstacking individual boxes or cases of relatively small size, such as lug boxes, milk bottle cases and the like, have been known, such machines are not suitable for stacking or unstacking various other types of loads. Thus, special problems are involved in handling stacks of large so-called bulk bins capable of receiving about eighteen lug boxes of fruit and therefore weighing over three-quarters of a ton when full, with a stack from three to five bins high weighing from nearly three tons to nearly five tons. If a machine is to be satisfactory for unstacking these bins, it must be capable of dependably supporting the bins during the unstacking procedure and of completely and automatically destacking a succession of stacks in rapid order, for example, at a rate of one stack destacked about every minute.

Furthermore, conventional stack handling machines are not satisfactory for rapidly stacking or unstacking pallet loads of separate articles where the articles are not tied together or otherwise associated as a unit, such as barrels of oil or cartons supported on a pallet.

Accordingly, an object of the present invention is to provide a stack handling apparatus for unstacking a stack of loads or for stacking such loads wherein adjacent loads in the stacks are maintained in vertically spaced relation to each other.

Another object is to provide an apparatus for rapidly and dependably unstacking stacks of loads, and stacking such loads, wherein each load and thus a stack thereof are of considerable size and weight.

Another object is to provide an apparatus for handling stacks of loads wherein each load is composed of separate articles not tied together or otherwise associated as a unit.

Another object is to provide an apparatus for minimizing the labor involved in unloading fruit from bulk bins and for arranging the bins for transport back into the field.

Another object is to provide a stack handling apparatus that is strong and durable for supporting stacks of loads weighing several tons.

Another object is to provide a stack handling apparatus which is capable of automaticaly unstacking stacks of loads, or stacking loads, that are delivered to the apparatus in succession.

These, together with other objects and advantages of the invention will be readily apparent upon reference to the following description and accompanying drawings, in which:

FIGURE 1 is a top plan of the subject stack handling apparatus with portions broken away to show further details of the apparatus, with a bulk bin and stacks thereof shown in dashed outline, and with stack supporting dogs of the apparatus shown retracted.

FIGURE 2 is a somewhat enlarged, vertical longitudinal section taken on line 2—2 in FIGURE 1 and also showing a stack of bulk bins in dashed outline.

FIGURE 3 is a fragmentary, somewhat enlarged, transverse vertical section taken on a plane at a position indicated by line 3—3 in FIGURE 1 with the stack supporting lugs being shown in dashed lines in projected positions.

FIGURE 4 is a fragmentary horizontal section taken on a plane at a position indicated by line 4—4 in FIGURE 2 with a stack of bulk bins being shown in dashed outline.

FIGURE 5 is a fragmentary longitudinal vertical section taken on a plane at a position indicated by line 5—5 in FIGURE 3 and showing a stack of bulk bins in the apparatus depressing a cam controlling lever, the stack supporting dogs projected into the space between a pair of adjacent bins in the stack, and the stack being supported by an elevator of the apparatus.

FIGURE 6 is a fragmentary, enlarged vertical transverse section taken on line 6—6 in FIGURE 1.

FIGURE 7 is a fragmentary, enlarged vertical transverse section taken on line 7—7 in FIGURE 1.

FIGURES 8A and 8B when placed end-to-end are a schematic diagram of the electrical circuit used in the subject apparatus.

FIGURES 9 through 14 are diagrammatic views, FIGURES 9, 10, 12 and 14 being side elevations and FIGURES 11 and 13 being vertical transverse sections, showing successive stages in the operation of the apparatus for unstacking purposes.

Although the stack handling apparatus of the present invention handles various types of loads including those described above, the apparatus is conveniently described below as it is used in unstacking stacks of bulk bins 20 (FIG. 1). In general, the apparatus includes a feeding conveyor 22 that conveys stacks of the bins past an ingress station 23 onto an unstacking conveyor 25, the latter conveying each stack into an unstacking station 26 within an unstacker 28. The unstacker destacks the stack and places each bin individualy back onto the unstacking conveyor which then conveys it through an egress station 30 to a dumper, not shown, for automatically dumping the contents of each bin.

Specifically, the unstacker 28 includes an upright frame 36 (FIG. 2) supported on a floor 37 and straddling the unstacking conveyor 25. The frame has pairs of front and rear legs 38 respectively interconnected by front and rear lower cross pieces 39 engaging the floor. The front and rear legs on each side of the unstacking conveyor have lower ends rigidly interconnected by base angles 40 on the floor and upper ends rigidly interconnected by longitudinally extending top plates 42. Base cross pieces 43 (FIG. 3) rigidly interconnect the base angles, and center legs 44 have lower ends connected to the base cross pieces and upper ends secured to the top plates on their respective sides of the unstacking conveyor.

With reference to FIGURES 2 and 3, the frame 36 has a horizontal, lower longitudinal support angle 46 rigidly interconnecting the front and rear legs on each side of the unstacker 28 and a pair of horizontal, upper longitudinal support angles 47 rigidly interconnecting the front and rear legs on each side. Upper cross pieces 49 extend between each pair of upper longitudinal support angles and are connected to these angles as well as to the adjacent center legs 44.

The frame 36 also provides vertical side and horizontal top plates 56 and 57 projecting forward from the upper ends of the front legs 38 and from the forward ends of the longitudinal top plates 42 (FIG. 2). Upper and lower front cross angles 58 extend transversely of and above the unstacking conveyor 25 and have opposite ends connected to the front edges of the top and side plates. Similarly, upper and lower rear cross angles 60 rigidly interconnect the front legs in rearwardly spaced parallel relation to the front cross angles. Four spaced, vertical front bars 62 (FIG. 4) extend between and are connected to the front cross angles, and two vertical rear bars 63 interconnect the rear cross angles. Upper horizontal bearing support angles 66 are secured to the front legs and project forwardly toward and are connected to the outermost front vertical bars, whereas lower horizontal bearing support angles 68 interconnect the confronting front and rear vertical bars. A vertical switch mounting bracket 70 is supported on the lower support angles 68 and extends upward therefrom.

From the foregoing description it is to be noted that the front and rear legs 38 (FIG. 4) are positioned at the corners of a square and that an upright U is formed by the rear cross piece 39 and the rear legs, that is, there is an unobstructed passageway between the rear legs for admitting a stack of the bins 20. However, the front legs 38, the front cross piece 39, and the lower front cross angles 58 and 60 (FIG. 2) define a rectangular space which has a height greater than the height of one of the bins 20 but less than the height of two bins. Furthermore, the unstacking station 26 is generally defined by four vertical planes (FIG. 1), these planes including a vertical plane projecting upward from the rear cross piece 39, vertical planes respectively containing the inner edges of the front and rear legs on opposite sides of the unstacker, and a vertical plane containing the rear edges of the rear across angles 60. This generally square area is slightly larger than one of the bins 20.

The frame 36 also has longitudinal guide rails 75 projecting rearward from the rear cross piece 39 with these rails having rear end portions 76 diverging with respect to each other. A rear cross member 77, resting on the floor 37, extends underneath the guide rails and is connected thereto in spaced parallel relation to the rear cross piece. The floor has an open pit 78 located between the rear cross member and the rear cross piece and is for a purpose to be described.

The unstacking conveyor 25 extends through the unstacker 28 and includes channels 80 secured to the front and rear cross pieces 39. The channels have front portions 82 projecting forward from the unstacker through the egress station 30 and rear portions 83 projecting rearward from the unstacker and terminating adjacent to the pit 78. A transverse support member 85 rigidly interconnects the rear portions of the channels as does a cross brace 86, and longitudinal mounting bars 87 extend over the pit and have front and rear ends rigidly connected to the cross brace 86 and to the rear cross member 77.

The unstacking conveyor 25 has a driven shaft 90 over the pit 78, and the shaft is journalled in bearings 91 on the mounting bars 87. Sprockets 92 are mounted on opposite ends of the driven shaft. The unstacking conveyor also has a drive shaft 94 spaced forward of the egress station 30, and sprockets 95 are mounted on the opposite ends of this shaft. Endless chains 96 are trained around aligned sprockets 92 and 95 and have upper runs 97 fitted in the channels 80. An unstacking conveyor drive motor 99 is mounted on the flood and has a drive connection 100 to the drive shaft 94 so that when this motor is energized, the upper runs of the chains travel from the rear cross piece toward the front cross piece.

The feeding conveyor 22 has generally the same construction as the unstacking conveyor 25 in that the former provides channels 110 supported above the floor at the same height as the channels 80, a driven shaft 112 journalled in bearings 113 on the mounting bars 87, drive sprockets 114 mounted on opposite ends of the driven shaft, and chains 115 providing upper runs in the channels 110 and being trained around the drive sprockets 114. It is to be noted that the feeding conveyor is only partially shown in FIGURE 1 and that this conveyor has an opposite receiving end on which the stacks of bins are placed by a fork lift truck. A feed drive motor 118 is mounted in the pit 78 and is connected by a chain 119 to a driven sprocket 120 on the driven shaft 112 so that when this motor is energized, the upper runs of the feeding conveyors move toward the unstacking conveyor. The forward velocity of the upper runs 97 of the unstacking conveyor is, however, greater than the forward velocity of the upper runs of the feeding conveyor.

Still further, the subject apparatus includes a spanning conveyor 125 which is actually an extension of the unstacking conveyor 25. This short conveyor spans the pit 78 and includes spaced channels 126 mounted on transverse rods 127, the latter being secured to the mounting bars 87. Driven sprockets 128 are secured to the driven shafts 90 of the unstacking conveyor, and idler sprockets 130 are rotatably mounted on the driven shaft 112 of the feeding conveyor 22. Chains 132 are trained around the driven and idler sprockets 128 and 130 and have upper runs in the channels. The chains 132 are motivated by the unstacking conveyor and their upper runs move with the same velocity as the upper runs of the unstacking conveyor chains 96. It is to be noted that the chains of the spanning conveyor have rear end portions in overlapping relation with the forward end portions of the chains 115 of the feeding conveyor and front end portions overlapping with the rear end portions of the chains 96 of the unstacking conveyor.

As the stacks of bins 20 are advanced forwardly by the feeding conveyor 22, they cause successive actuation of switches LS15 and LS14, respectively, which are mounted on a bracket 138 projecting outward from the left guide rail 75; it is to be noted that when used herein, the terms "left" and "right" are with reference to a vantage point at the ingress station 23 looking forward toward the unstacker 28. The switches LS14 and LS15 have upstanding arms 139 and 140, respectively, which are interconnected by a link 142; there is lost motion in this interconnection, however, so that LS15 is actuated immediately after its arm 140 is engaged whereas arm 140 must move through a predetermined angle before LS14 is actuated.

For actuating switches LS14 and LS15, a tube 145 projects upward from the rear end portion 76 of the left guide rail 75, and a shaft 146 is journalled within this tube. An upper lever 148 is secured to the upper end of the shaft and extends radially inward therefrom into the path of the forwardly moving stacks of bins 20. A lower lever 150 projects radially outward from the lower end of the shaft so that the arms 139 and 140 of the switches LS14 and LS15 are in the path of movement of the lower lever. The upper lever moves between a normal position generally perpendicular to and in the path of the stacks of bins (as shown in full lines in FIG. 1) and two switch actuating positions progressively forwardly angularly displaced from the normal position (one of which is shown in dashed lines in FIG. 1). The lower lever moves through an arc in response to movement of the upper lever, as above described, between a forwardly projected position and positions projecting laterally outward and bearing against the arm 140 of switch LS15. A tension spring 152 interconnects the left guide rail 75 and the lower lever for yieldably urging the upper lever into its normal position. When a stack of bins 20 is in the unstacking station 26, the next-to-the-lowermost bin in the stack, or at least a bin which is at the same elevation as the next to the lowermost bin in a stack, actuates switches LS1 and LS9 (FIG. 3), both of which are mounted on the bracket 70 and may actuate a switch LS10 also mounted on the bracket 70. Switches LS1, LS9 and LS10 have arms 180, 181, and 182, respectively. For effecting actuation of these latter switches by said next-to-the-lowermost bin, a cam shaft 185 is journalled in bearings 186 that are mounted on the lower horizontal bearing support angles 68. Cams 188, 189 and 190 are secured to the cam shaft in axially spaced relation therealong and respectively adjacent to the switch arms 180, 181 and 182. The cams have arcuate surfaces 191 (FIGS. 4 and 5) extending about major portions of their respective circumferences and relatively shorter flat surfaces 192. A radius arm 194 is secured to the cam shaft adjacent to the right front leg 38 of the frame 36.

A cam controlling lever 196 has an upper end pivoted on the rear upper cross angle 60 and hangs downward therefrom in generally the same plane as the radius arm 194. A roller 197 is mounted on the lower end of the lever, and a link 198 pivotally interconnects the cam controlling lever and the radius arm 194 so that the cam shaft is rocked back and forth in response to pivoting movement of the lever. A rod 199 projects forward from the upper portion of the cam controlling lever, and a weight 200 is mounted on this rod for yieldably urging the cam controlling lever rearwardly into a normal position but permitting forward pivoting movement of the lever into a switch actuating position.

In the normal position of the cam controlling lever 196, the flat surfaces 192 of the cams 188, 189 and 190 are in confronting relation to the arms 180, 181 and 182 of the switches LS1, LS9 and LS10, respectively. It is to be noted that when these cams are viewed along the axis of the cam shaft (FIG. 5), the flat surfaces are displaced circumferentially of the cam shaft. Thus, when the cam controlling lever is depressed forward into its switch actuating position, the arcuate surface of the cam 188 first engages its associated arm 180 and actuates the switch LS1, and, thereafter, the arcuate surface of the cam 189 engages its associated arm 181 and actuates the switch LS9. If the cam controlling lever is moved far enough forward, under certain operating conditions of the apparatus as will be subsequently described, the arcuate surface of the cam 190 engages the arm 182 and actuates the switch LS10. Under normal operating conditions of the apparatus, however, only the switches LS1 and LS9 are actuated by depression of the cam controlling lever. A limit arm 202 (FIG. 4) on the cam shaft engages a limit tab 203 on the lower left bearing support angle 68 thereby to limit rotation of the cam shaft as the cam controlling lever moves rearward into its normal position.

The bins 20 in the unstacking station 26 are raised and lowered by an elevator 210 (FIGS. 1, 2 and 3) mounted on the frame 36. The elevator provides front and rear outside vertical tracks 211 (FIG. 3) having upper portions 212 secured to the inner upper support angles 47 and lower portions 214 secured to the lower support angles 46. Inside vertical tracks 216 have upper ends 218 secured to the top plates 42 and lower ends 219 secured to the inner base angles 40 so that the inside tracks are inwardly spaced from their respective outside tracks 211. Channel connectors 220 rigidly interconnect adjacent outside and inside tracks on the front sides of front tracks and the rear sides of the rear tracks so that the channels of these connectors face the spaces between the adjacent tracks.

The elevator 210 also has left and right, upper and lower shafts 225 and 226 (FIGS. 1–4) journalled in bearings 227 mounted on the upper and lower portions of the front and rear legs 38 and in bearings 228 mounted on the upper and lower portions of the center legs 44. Upper and lower, front and rear sprockets 230 are secured to opposite ends of the elevator shafts with upper and lower sprockets adjacent to each of the inside and outside tracks 211 and 216 being coplanar and slightly displaced from the plane of their associated track. Front and rear, left and right endless chains 232, 234, 236 and 238 are trained around coplanar upper and lower sprockets 230 and have inside or operating runs extending vertically generally along the inside tracks. Each chain includes a series of interconnected links 240 with a pair of such links 240' (FIG. 3) in the inside run being vertically spaced apart.

L-shaped bars 242 (FIG. 2) have vertical portions 243 interconnecting the pairs of spaced links 240' in the respective chains 232, 234, 236 and 238 and inwardly projecting horizontal portions 244. L-shaped mounting plates 250 (FIG. 3) have vertical and horizontal portions 252 and 254 located respectively on opposite sides of the vertical and horizontal portions of the L-shaped bars and bolted thereto. In addition, a guide plate 256 is located on the opposite side of each set of tracks 211 and 216 from the L-shaped plates 250, and bolts 258 project through the vertical portions of the mounting plates, between the inside and outside tracks, and through the guide plate with nuts 259 threaded on the bolts 258. Rollers 260 encircle the bolts in the space between the tracks so that the L-shaped mounting plates are guided for movement along the tracks in response to rotation of the upper and lower shafts 225 and 226. Support angles 262 are secured to the horizontal portions 254 of the mounting plates, and lift pads 264 are secured to horizontal flanges of the support angles. The lift pads are all in a common substantially horizontal plane extending across the unstacking station 26. Furthermore, the lift pads project from the planes of the inside edges of the legs 38 toward, but are spaced outward from, the adjacent chains 96 of the unstacking conveyor 25 and have inner edges 265 spaced apart less than the width of a bin 20.

For raising and lowering the lift pads 264, a reversible elevator motor 270 is mounted on the left top plate 57, and a drive pulley 271 is mounted on its output shaft. A countershaft 273 is journalled in bearings 274 on the upper support angles 66 and extends transversely of the unstacker 28 and outwardly through the side plates 56. A driven pulley 276 is mounted on the countershaft, and an endless belt 277 extends around the drive and driven pulleys so that the countershaft is rotated when the elevator motor is energized. Gear boxes 280 are mounted on the outside of the side plates 56 and receive the outwardly extending ends of the countershaft 273. Output sprockets 282 are provided on the gear boxes, and these sprockets are connected to driven sprockets 284 respectively mounted on front ends of the upper elevator shafts 25 that project through the front legs 38 by chains 285 extending around the output and driven sprockets. Thus, when the elevator motor is energized, the elevator shafts are rotated in one direction or the other thereby simultaneously to raise or to lower the lift pads between a lowermost position wherein the common plane of the lift pads is slightly below the upper runs 97 of the unstacking conveyor chains 96 (FIG. 3) and an uppermost position adjacent to the upper support angles 47.

During the unstacking cycle, a portion of the stack of bins 20 is supported on front and rear stack supporting dogs 290, 291, 292 and 293. These dogs are elongated flat rectangular bars of steel each having an outside edge 296 (FIG. 6), an inner edge 297 and upper and lower surfaces 298 and 299.

For mounting the dogs 290, 291, 292 and 293, front and rear brackets 300 (FIG. 2) are mounted on the upper support angles 47 on both sides of the frame 36 with each bracket having spaced upper and lower flanges 301 and 302 defining horizontal, transversely extending grooves 303 that slidably receive their respective dog. The dogs on each side of the frame are spaced from each other lengthwise relative to the conveyor 25. Furthermore, the dogs are all in a common horizontal plane spaced above the conveyor by a distance slightly greater than the height of one bin. Preferably, the inner edge 297 of each dog is exactly opposite to the inner edge of a dog on the other side of the frame. The dogs are constrained by the brackets 300 to move with rectilinear motion, and only in their common plane, between retracted positions with their inner edges substantially in the previously referred to vertical plane containing the inner edges of the adjacent front and rear legs 38 and bin supporting positions projected into the unstacking station 26 and in the path of elevational movement of the bins. In the supporting positions, the outer portion of each dog remains in its respective grooves, as is believed understood.

The left front dog 292 (FIG. 7) has a longitudinal slot 306 therein, and a pair of spaced lugs 308 project upward on opposite sides of the slot. A finger 309 is pivoted between these lugs and hangs downward through the slot for a purpose to be described.

To control the movement of the dogs 290-293 between their retracted and projected positions, dog control shafts 315 (FIG. 2) are journalled in bearings 316 mounted on the front and rear legs 38 slightly below and outward of the bearings 227 for the upper shafts 225 of the elevator 210. Radius arms 317 are secured to the dog control shafts and extend downward therefrom above the dogs, and links 318 pivotally interconnect these radius arms and upstanding ears 319 on their respectively adjacent dogs. A connecting shaft 320 is journalled in bearings 321 that are mounted on the front legs 38 and is in rearwardly downwardly spaced parallel relation to the countershaft 273. Bevel gears 322 are secured to opposite ends of the connecting shaft and mesh with bevel gears 323 secured to the front ends of the dog control shafts. It is evident that this connecting shaft provides for unitary rocking movement of the dog control shafts, that is, rotation of one of the dog control shafts effects rotation of the other dog control shaft so as simultaneously to move all of the dogs into supporting positions or to move all of the dogs into retracted positions.

For rocking the dog control shaft 315, a cylinder 326 is mounted on the rear surface of the left rear leg 38, and a piston rod 327 extends upward from the cylinder. A crank 328 is secured to the rear end of the left dog control shaft, and a link 329 pivotally interconnects the crank and the piston rod so that upon reciprocation of the rod, the dog control shafts are rocked back and forth and, as above stated, the dogs 290-293 correspondingly move between their retracted and projected positions. Solenoid valves AV1 and AV2 are also mounted on this rear leg and are connected to the cylinder for effecting reciprocation of the piston rod.

The elevator 210 and the dogs 290-293 are controlled in the following manner. A front actuating rod 340 (FIG. 3) is secured to the vertical portion 252 of the L-shaped plate 250 associated with the left front elevator chain 236. This rod has a lower end 341, an upper end 342, and an outwardly projecting detent 343. A horizontal lower front switch mounting bar 344 (FIG. 2) is secured to the lower support angle 46 adjacent to the left front elevator chain, and a switch LS3 is adjustably slidably mounted on this mounting bar. The switch LS3 has a forwardly projecting arm 345 in the path of movement of the rod 340 and is depressed so as to actuate switch LS3 by the lower end 341 of this rod when the lift pads 264 are in their lowermost positions. Furthermore, a vertical upper front switch mounting bar 348 (FIG. 3) is secured to the inner upper support angle 47 adjacent to the left front elevator chain, and switches LS8 and LS5 are respectively adjustably slidably mounted on this upper vertical bar with their arms 349 and 350 projecting inward in the vertical path of movement of the outer detent 343 on the front actuating rod. Thus, as the elevator rises, the outer detent successively engages the arm 349 and then the arm 350 so as to depress these arms and actuate their respective switches. However, the switch LS5 is an upper limit safety switch and is not actuated in the normal operation of the apparatus.

A rear actuating rod 360 (FIG. 2) is secured to the vertical portion 252 of the rear L-shaped mounting plate 250 associated with the left rear elevator chain 238. This rear rod has a lower end 361, an upper end 362, and an outside detent 363 projecting from the upper end. A vertical lower rear switch mounting bar 365 has upper and lower ends respectively connected to the inner upper support angle 47 and to the lower support angle 46. Switches LS6 and LS12 are adjustably slidably mounted on the lower rear switch mounting bar and have arms 366 and 367 projecting into the path of movement of the lower end 361 and the outside detent 363, respectively, of the rear actuating rod. Furthermore, an upper rear switch mounting bar 370 (FIG. 4) is mounted on and extends upward from the inner upper support angle 47, and switch LS13 is adjustably slidably mounted on this bar and has its arm 371 projecting inward into the path of movement of the outside detent 363. During elevational movement of the lift pads 264, the outside detent engages the arms 367 and 371 of the switches LS12 and LS13, respectively, to depress these arms and actuate their respective switches. In the lowermost position of the lift pads, the lower end of the rod 360 does not depress the arm 366 of the switch LS6, a lower limit safety switch. It is only when the lift pads move below their lowermost position as a result of defective operation of the elevator that the arm 366 is depressed to actuate its switch.

In addition, switches LS7 and LS11 (FIGS. 7 and 6, respectively) are mounted on the left outer upper support angles 47 and have arms 375 and 376 respectively projecting upward adjacent to the dogs 292 and 293. The arm 375 is in the path of the finger 309 and is depressed thereby as the dog 292 projects; as this dog is retracted, the finger simply pivots on the lugs 308 and moves upward in the slot 306 to slip past the arm 375 so that the switch LS7 is actuated only when the dog 292 is projected. The arm 376 projects upward in back of the outer edge of the left rear dog 293 and is depressed only by retraction of this dog so that the switch LS11 is actuated only when the dog is retracted, but as long as the dog 293 is retracted, the arm 376 is held depressed.

As each bin 20 progresses through the egress station 30 (FIG. 1), two other switches, namely, LS2 and LS4 are successively actuated. These switches are mounted on a bracket 380 projecting outward from a front guide rail 382 that extends forward from the right front leg 38. Furthermore, the switches LS2 and LS4 have upwardly projecting arms 384 and 386, respectively, that are interconnected by a link 388 providing lost motion as with the link 142 connecting the switches LS14 and LS15.

Similar to the tube 145, a tube 390 extends upward from the front guide rail 382, and a shaft 391 is journalled within this tube. An upper lever 392 is secured to the shaft 391 and projects inward therefrom toward the unstacking conveyor 25. A lower lever 394 is secured to the lower end of the shaft and projects outward therefrom adjacent to the front guide rail so that the arm 384 of the switch LS2 is in the path of movement of the lower lever. When a bin engages the upper lever and rotates the shaft 391, the lower lever is moved rearward against the arm 384 thereby successively depressing the arm 384 and then the arm 386 and actuating their respective switches, it being emphasized that switch LS2 is actuated before switch LS4. After the bin has passed the egress station and has disengaged the upper lever, a tension spring 403 interconnecting the upper lever and the tube returns the upper lever to its normal inwardly projecting posititon.

In addition to the switches identifie dabove as LS1 through LS15, the electrical circuit (FIGS. 8A and 8B) for the unstacking apparatus of the present invention includes a three-phase source of voltage providing three lines L1, L2, and L3, a main switch 410 having an automatic position A, a hand position H and an intermediate off position. The circuit provides relays: R1 with associated contacts R1a and R1b; R2 with contacts R2a and R2b; R3 with contacts R3a; R4 with contacts R4a and R4b; R5 with contacts R5a and R5b; R6 with contacts R6a, R6b, R6c; and R7 with contacts R7a, R7b, R7c, and R7d. Also, the circuit provides magnetic relays LR1 and LR3 with associated contacts LR1w, x, y and z; and LR2 and LR4 with associated contacts LR2w, x, y and z. Insofar as relays LR1-4 are concerned, the relays LR1 and LR2, when energized, close their respective contacts LR1w, x, y, z and LR2w, x, y and z. These contacts are mechanically held closed and are opened only by energization of their respective relays LR3 and LR4. Still further, the electrical circuit includes a jog-up switch 412 and a jog-down switch 413 for manual operations and a pilot light 415. The switches LS1 to LS15 are all spring-urged into normal position. The components of the electrical circuit will be described in greater detail in the subsequent description of the operation of the subject apparatus.

Before describing the operation of the unstacking apparatus, the construction of each bin 20 is to be noted. Thus, each bin has side walls 20w (FIG. 9) interconnected in squared relation to each other, a bottom wall 20x, front and rear runners 20y, and an intermediate runner 20z, the runners being fastened to the bottom wall in spaced relation to each other. Although the subject apparatus can handle stacks of two or more bins, a stack including just three bins is illustrated with the bins being identified as a bottom bin 20b, a middle bin 20m and a top bin 20t and with spaces between the adjacent bins being identified as Sl and Su. It is of interest to note that the bins actually used with the subject apparatus are of relatively heavy gauge metal and individually weigh about one hundred and fifty-six pounds when empty and from 1600 to 1800 pounds when full of citrus fruit, for example. As previously mentioned, therefore, a stack of three bins weighs nearly three tons when the bins are full. It is also to be noted that the bins actually used are about forty-seven inches square and about thirty inches high with the space between the lower surfaces of the runners and the bottom wall 20x being about three and one-half inches, this dimension being the vertical dimension of the space Sl or Su. Although the subject apparatus is not limited to use on bins having these specific characteristics, it is highly successful in handling such bins and the description of these specific characteristics may help to understand the problems involved.

Considering now the operation of the apparatus for automatically unstacking successive stacks of bins 20, it is first to be noted that with the switch 410 in an off position and no bins at any of the stations 23, 26 or 30, all of the components of the electrical circuit are as illustrated in the FIGURES 8A and 8B. The lift pads 264 are in their lowermost positions so that contacts 1 and 2 and contacts 3 and 4 of the switch LS3 (line 25) are respectively held open and closed by the rod 340. Also, the dogs 290–293 are retracted so that the contacts of the switch LS11 (line 10) are held closed by the retracted dog 293.

When the switch 410 (line 1) is thrown to the autoamtic A position, the relays R1 (line 1) and R5 (line 10) are energized. Closure of the contacts R1a (line 2) lights the pilot light 415 and energizes relays R3 and R4 (lines 8 and 9) through contacts 1 and 2 (line 5) of the switch LS9, whereas closure of the contacts R1b (line 21) simply conditions the relay LR2 for subsequent energization. With the contacts R5a (line 44) and R5b (line 37) closed, both of the unstacking conveyor and feeding conveyor motors 99 and 118 are energized whereby their respective conveyors 25 and 22 (FIG. 1), as well as the spanning conveyor 125, are motivated. The energized relay R3 (FIGS. 8A and 8B) opens its contacts R3a (line 14) and the contacts R4a (line 38) and R4b (line 39) are respectively closed and opened, all for circuit conditioning purposes.

With continued reference to FIGURES 8A and 8B and reference to FIGURES 9–14, as noted, stacks of bins 20 are placed on the receiving end, not shown, of the feeding conveyor 22 which conveys them successively into the ingress station 23. The leading stack of bins strikes the upper lever 148 and successively actuates switches LS15 (line 36) and LS14 (lines 11 and 41). However, opening of the switch LS15 has no effect at this time since the contacts R4a are closed across switch LS15. Thus, the leading stack moves onto the spanning conveyor 125 where it is accelerated and moved forwardly on unstacking conveyor 25 onto the unstacking station 26 (FIG. 9). When the middle bin 20m engages and depresses the cam controlling lever 196 (FIG. 10), the switches LS1 (line 16) and LS9 (line 4) are successively actuated. Before considering the effect of the actuation of switch LS1, it is to be noted that actuation of the switch LS9 opens its contacts 1 and 2 whereby the relays R3 and R4 are de-energized and the contacts R4a are thereby opened. As the slower moving, next successive stack of bins on the feeding conveyor 22 engages the upper lever 148 (FIG. 12) and actuates the switch LS15, opening this switch, the feed conveyor motor 118 is de-energized thereby stopping the feed conveyor. Thus, this next successive stack of bins remains at the extreme forward end portion of the feeding conveyor, that is, at the ingress station 23, and holds the switch LS15 open (although not as yet actuating the switch LS14) during substantially the entire time that the leading stack is being unstacked at the unstacking station 26.

Furthermore, before returning to the effect of switch LS1, it is to be noted that the purpose of the switch LS14 is to insure that the dogs 290–293 are in their retracted positions before allowing a stack of bins 20 to proceed into the unstacking station 26. As evident from the electrical circuit diagram, switch LS11 (line 10) and contacts 1 and 2 of switch LS14 (line 11) are in parallel so that if both of these switches are opened, the relay R5 is de-energized causing both of the feeding and unstacking conveyors 22 and 25 to stop. When the switch LS14 is actuated, however, its contacts 3 and 4 (line 41) are closed energizing the solenoid AV1 which retracts the dogs in the event that they were previously projected; since the switch LS11 is held closed whenever the dogs are retracted, retraction of the dogs in this manner re-energizes relay R5 and starts the unstacking and feeding conveyors moving again.

Closure of the switch LS1 (line 16), and remembering that LS9 is not yet actuated, energizes the relay LR1 through the closed contacts R2b, LS1, 1 and 2 of both LS7 and LS8 and R7d (line 25). Thus, the contacts LR1w (line 17) close to hold the relay LR1 energized, and the contacts LR1z (line 27) close and energize the up-elevator relay R6. Closure of the contacts LR1x and LR1y condition the circuit for other functions to be described. With the relay R6 energized, its contacts R6a, b, and c (lines 32, 33 and 34) close whereby the elevator motor 270 is energized and the lift pads 264 rise and lift the stack of bins 20 (FIG. 10). Thus, the contacts 1, 2 and 3, 4 of the switch LS3 (line 25) close and open respectively.

Before setting forth what happens to the rising bins 20, it is once again to be noted that actuation of the switch LS9 de-energizes relays R3 and R4 whereby their respective contacts R3a and R4b are closed and the contacts R4a are opened. However, closure of the contacts 3 and 4 of the switch LS9 energizes relay R2 thereby by closing its holding contacts R2a (line 7) and opening its contacts R2b (line 16) which open the normal energizing circuit for the relay LR1, this relay remaining energized, however, because of its holding contacts LR1w. Parenthetically, it is to be noted that if there is a failure in the operation of the elevating circuit or mechanism, and the bins 20 continue forward against the lever 196, the switch LS10 (line 10) is opened by the continued depression of this lever thereby opening the contacts R5a and R5b and de-energizing both of the feeding and unstacking conveyor drive motors 118 and 99. This, of course, stops all movement of the bins 20 to permit correction of the defects.

Continuing with the unstacking cycle, when the lift pads 264 have lifted the stack to a position where the plane of the dogs 290–293 passes through the space Sl between the middle and bottom bins 20m and 20b (this being only after about four to five inches of upward travel in actual embodiments of the apparatus), the detent 363 actuates the switch LS12 (line 43) closing its contacts and energizing solenoid AV2 (line 42) through LS12, R4b, R1a, and contacts 1 and 2 of both of the switches LS5 and LS6 (line 1), and the main switch 410. The solenoid AV2 actuates the rod 327 which rocks the dog control shafts 315 thereby rapidly thrusting the dogs into projected positions in the space Sl while the stack continues to rise. Although FIGURE 11 shows this position of the dogs, FIGURE 11 actually shows the unstacker at a time in the unstacking cycle slightly after the dogs are initially so positioned.

Projection of the left rear dog 293 opens the switch LS11 (line 10) although this opening has no function at this time. However, projection of the left front dog 292 momentarily closes the contacts 3 and 4 and opens the contacts 1 and 2 of the switch LS7 (lines 15 and 16) which causes the lift pads 264 to descend (FIG. 11). That is, with the contacts 1 and 2 open, the relay LR1 (line 15) de-energizes. With the contacts 3 and 4 closed, the relay LR3 (line 20) is energized through closed contacts LR1y (which remains mechanically closed even though the relay LR1 is de-energized), contacts R1b, contacts 3 and 4 of the switch LS8, contacts 1 and 2 of LS2, contacts R7d, contacts R1a and to the main switch 410 as is believed understood. The contacts LR1w, x, y and z therefore open whereupon the elevator motor 270 is de-energized and the upward movement of the lift pads 264 stops, it being remembered that the dogs 290–293 are now in the space Sl.

Closure of the contacts 3 and 4 (line 15) of the switch LS7 also energizes the relay LR2 through LS2, contacts R7d, contacts R1a and the main switch 410. Thus, the contacts LR2w, x, y and z are closed, the contacts LR2w holding the relay LR2 energized, the contacts LR2x and y having circuit conditioning functions to be explained, and the contacts LR2z energizing the down-elevator relay R7 (line 29) so as to close its contacts R7a, b and c (lines 31 and 35). In this manner, the elevating motor 270 is energized to lower the lift pads 264. Also, the energized relay R7 opens its contacts R7d (line 25).

The elevator 210 lowers the top and middle bins 20t and m onto the dogs 290–293. The bins 20t and 20m are, of course, supported on these dogs and are of sufficient weight to prevent retraction of the dogs even if the retracting solenoid AV1 were to be energized.

As the elevator 210 moves down, the detent 363 again actautes the switch LS12 (line 42). Since the dogs 290–293 are already projected, energization of the solenoid AV2 by the switch LS12 has no effect on the position of the dogs. When the lift pads 264 reach their lowermost position, the lower end 341 of the front switch actuating rod 340 actuates the switch LS3 (line 25) closing its contacts 3 and 4 and opening its contacts 1 and 2. The elevator motor is thus de-energized since opening of contacts 1 and 2 of the switch LS3 (contacts R7d being open at this time) de-energizes the relay LR2 and since closing of the contacts 3 and 4 of the switch LS3 energizes the relay LR4 through the closed contacts LR2y and contacts 3 and 4 of the switch LS3. Therefore, the contacts LR2w, y and z open whereby the relay R7 is deenergized, opening its contacts R7a, b and c and closing its contacts R7d.

At this point in the cycle of unstacking, the elevator 20 has lowered the bottom bin 20b onto the continuously moving unstacking conveyor 25 whereupon the bottom bin is conveyed out of the unstacking station 26 and toward the egress station 30 (FIG. 12). Furthermore, it is to be noted that the lever 196 continues to be held depressed by the middle pin 20m supported on the dogs 290–293.

As the bottom bin 20b is conveyed through the egress station 30, the switches LS2 (line 12) and LS4 (line 7) are successively actuated. Although actuation of the switch LS4 accomplishes no purpose at this point in the unstacking cycle, closure of the contacts 3 and 4 of LS2 energizes the relay LR1 (line 15) thereby energizing up-elevator relay R6, and as previously explained, causes the lift pads 264 to rise. As the lift pads move out of their lowermost position, the contacts 1 and 2 of the switch LS3 (line 25) are closed whereas its contacts 3 and 4 are opened. Upward movement of the outside detent 363 actuates the switch LS12, but the position of the dogs is not affected since they are already in projected positions.

The pads 264 (FIG. 12) engage and lift the bins 20m and 20t off the dogs 290–293 and immediately thereafter, the detent 363 actuates the switch LS13 (line 39) which energizes the solenoid AV1 (line 40) and retracts the dogs while the bins continue upward. It is to be noted that although the switch LS11 is closed by retraction of the left rear dog 293, no effect is produced as a result of such closure. Furthermore, the finger 309 slips (FIG. 7) over the arm 375 of the switch LS7 (line 15) and does not actuate the same. When the detent 343 strikes the arm 349, the switch LS8 (line 15) is actuated causing the elevator motor 270 to de-energize so as to stop the upward travel of the lift pads 264 and then to re-energize causing the lift pads to descend just as was accomplished by actuation of the switch LS7, as described above in connection with the initial upward movement of the lift pad, it being noted that switches LS7 and LS8 are connected in parallel.

As the elevator 210 moves downward (FIG. 13), the detent 363 engages and actuates the switch LS12 when the space Su is in the same plane as the dogs 290–293 thereby to energize the solenoid AV2 and to project the dogs into the space Su while the bins are descending. The dogs support the top bin 20t while the lift pads lower the middle bin 20m onto the unstacking conveyor 25 where such bin is conveyed through the egress station 30. Actuation of the switch LS2 (line 12) again causes the elevator 210 to rise for the third time and in the same manner as described above for the second ascent. It is to be noted that the lever 196 is still depressed but now by the remaining top bin 20t.

Also, as described above in regard to the middle bin 20m, the top bin 20t is transferred from the dogs 290–293 to the lift pads 264 and lowered thereon (FIG. 14). As the bin 20t descends, it moves below the lever 196 whereby the latter is allowed to move to its rearwardmost normal position. Thus, the switch LS1 (line 16) is opened and the contacts 3 and 4 of the switch LS9 (line 4) are also opened whereas the contacts 1 and 2 of the switch LS9 are closed. Relays R3 and R4 are again energized, it being noted that the relay R2 is held energized by its holding contacts R2a. This closes contacts R4a (line 38) whereby the feed motor 118 is energized and the next successive stack of bins advances onto the spanning conveyor 125. When the switch LS12 (line 43) is actuated by the descending detent 363, the solenoid AV2 is not energized because the contacts R4b (line 39) are opened. Thus, the dogs remain in retracted positions.

When the top bin 20t is placed on the unstacking conveyor 25 and moves through the egress station 30, the switch LS2 is actuated, but it does not elevate the lift pads 264 since both contacts R2b and R3a are open. However, when the switch LS4 is actuated, following actuation of switch LS2, the relay R2 is de-energized thereby closing its contacts R2b and reconditioning the circuit for energization of the relay LR1 by the next incoming stack which, therefore, starts the unstacking cycle all over again.

The described apparatus is particularly advantageous because of the speed of unstacking the stacks of bins 20. By providing flat dogs 290–293 that move with rectilinear motion in a horizontal plane, there is a minimum of lost motion in the unstacking cycle. As explained, the dogs enter and leave the spaces Sl or Su while the bins are ascending or descending. In actual embodiments of the apparatus, the dogs are projected or withdrawn from the three and one-half inch space S*l* or S*u* in about 0.2 second. In contrast with certain prior unstacking apparatus the subject apparatus used in association with stacks of bins having spaces between adjacent bins obviates raising the entire stack above the dogs on the first lift. Accordingly, time is saved, and strain on the elevator 210 is lessened.

Thus, the dogs 290–293 and their mounting and movement are primarily responsible for enabling the entire unstacking of three bins to be accomplished in just over one minute by actual embodiments of the apparatus.

The apparatus is also significant because of its simplicity and dependability. The elevator 210 and its lift pads 264; and the dogs 290–293 and their mounting and actuating mechanism, present a minimum of maintenance problems, are durable and strong, and, as above described, coact very effectively in transferring the bins 20 back and forth. Also noteworthy are the switch actuating rods 340 and 360 adjacent to the lift pads and the action of the dogs 292 and 293 and the cam controlling lever 196 and camshaft 195 for controlling the various switches and thereby the movements of the elevator.

Although the apparatus has been described for use in unstacking stacks of bins, it is also used for stacking bins and for handling stacks of other loads as previously noted. When employed as a stacker, certain changes are made in the electrical circuit, but the structure of and basic coaction of the dogs 290–293 and lift pads 264 remains the same.

A preferred embodiment of the invention has been shown and described, but it will be understood that changes and modifications may be made in the details thereof without departing from the spirit and scope of the appended claims.

The invention having thus been described, what is believed to be new and desired to be protected by Letters Patent is:

1. In an apparatus for handling a stack of loads, a substantially horizontal conveyor for moving a stack of loads in a predetermined forward direction, a plurality of dogs located on opposite sides of said conveyor, each of said dogs having an inner edge and an outer edge, means mounting the dogs on each side of said conveyor in spaced relation to each other lengthwise of said conveyor with all of said dogs being located in a common substantially horizontal plane spaced a fixed distance above said conveyor having their inner edges in confronting relation to each other, said means mounting said dogs for rectilinear movement whereupon the confronting inner edges of said pairs of dogs move toward and away from each other, lift pad means on opposite sides of said conveyor, means mounting said lift pad means in a common substantially horizontal plane so that said lift pad means extend forward and rearward of said dogs with respect to said conveyor, means for elevationally moving said lift pad means while maintaining said pad means in a common plane thereby to lift a stack on said conveyor toward said dogs, and means for simultaneously moving said pairs of dogs toward each other while said lift pad means are moving upward toward said dogs.

2. In an apparatus for handling stacks of loads wherein the loads are of uniform height, a substantially horizontal conveyor for conveying said stacks in a predetermined forward direction, a frame including spaced confronting longitudinal frame means upstanding on opposite sides of the conveyor and having upper end portions, said frame means extending lengthwise of the conveyor and thereby providing front and rear end portions, said frame including transverse frame means interconnecting the upper end portions of said longitudinal frame means at said front end portions thereof, said transverse frame means being spaced above said conveyor by a distance greater than said uniform height, elevator means on said longitudinal frame means for raising loads from and lowering loads onto said conveyor, load supporting means mounted on said longitudinal frame means and spaced above said conveyor by a distance greater than said uniform height for supporting loads raised thereto by said elevator means, actuating means mounted on said transverse frame means at a predetermined elevation above said conveyor greater than said uniform height but less than twice said uniform height, said actuating means including a lever pivotally mounted thereon, means yieldably urging said lever rearward from said transverse frame means and between said longitudinal frame means for engagement by a surface of the load which faces in the direction of movement of said conveyor, which load is located between said longitudinal frame means and is at said predetermined elevation thereby to pivot said lever forwardly, and means responsive to forward pivoting movement of said lever for directly causing elevational movement of said elevator means.

3. A system for handling a plurality of stacks of vertically spaced apart loads, said system comprising: conveyor means for moving one stack of the plurality of stacks in a substantially horizontal path of travel; stack feeding means for supplying stacks successively to said conveyor means; first power means for driving said feeding means; elevator means disposed alongside said conveyor means for raising said one stack from said conveyor means and for lowering the lowermost load of said one stack so raised onto said conveyor means, said raising and lowering movement being in a substantially vertical path of travel; supporting means disposed adjacent said vertical path for supporting a portion of one stack at a predetermined distance above said conveyor means; said supporting means supporting said portion of said one stack by engagement with the underside of the lowermost load of said portion of said one stack, said supporting means being movable between a first position wherein said supporting means projects into said path of travel and a second position wherein said supporting means is retracted out of said vertical path of travel; second power means for moving said supporting means between said first and second positions; first elevator control means responsive to the movement of a stack of loads on said conveyor means adjacent said support means for causing said elevator means to raise said stack of loads in said vertical path of travel; first support control means responsive to rising movement of said elevator means a first predetermined distance in said path of travel for causing said second power means to move said support means to said first position whereby said supporting means is projected into the space between the lowermost load and the next to the lowermost load of said stack raised by said elevator means; second elevator control means responsive to the movement of said supporting means from said first position to said second position for causing said elevator means to descend in said path of travel; third elevator control means responsive to movement of a load on said conveyor means past a predetermined point in said horizontal path of travel for causing said elevator means to rise in said vertical path of travel; second support control means responsive to rising movement of said elevator means a second predetermined distance in said vertical path of travel for causing said second power means to move said support means from said first position to said second position; fourth elevator control means responsive to rising movement of said elevator means a third predetermined distance in said vertical path of travel for causing said elevator to descend in said vertical path of travel.

4. In a mechanism for supporting a stack that is moved elevationally along a path to and from a predetermined elevation, a frame, bracket means mounted on said frame, said bracket means providing substantially horizontal groove means disposed transversely of and opening toward said path, a flat rectangular dog having inner and outer portions and opposite side edges slidably received in said groove means for movement between a stack supporting position with said outer portion within said groove means and said inner portion projected into said path for supporting a stack at said elevation and a retracted position with said inner portion withdrawn into said groove means for permitting elevational movement of said stack, said dog being provided with a longitudinally disposed slot, a finger pivoted on said dog and extending downward through said slot, a switch mounted on said frame, said switch having an arm projecting into the path of movement of said finger during movement of said dog, said finger engaging and moving said arm to actuate said switch when said dog moves in one direction, said finger engaging said arm and pivoting to slip past said arm without actuating said switch when said dog moves in a direction opposite to said one direction.

References Cited

UNITED STATES PATENTS

| | | |
|---|---|---|
| 2,769,570 | 11/1956 | Adams. |
| 2,897,949 | 8/1959 | Huisking _____ 214—6 |
| 2,978,125 | 4/1961 | Freeman. |
| 2,993,315 | 7/1961 | Verrinder et al. |
| 3,010,588 | 11/1961 | McBean et al. _____ 214—8.5 |
| 3,038,615 | 6/1962 | Roth et al. _____ 214—8.5 |
| 3,053,402 | 9/1962 | Russell et al. _____ 214—6 |
| 3,139,993 | 7/1964 | Lauer _____ 214—8.5 |
| 3,172,545 | 3/1965 | Schmid _____ 214—8.5 |

GERALD M. FORLENZA, *Primary Examiner.*

J. E. OLDS, *Assistant Examiner.*